United States Patent [19]

Kersten et al.

[11] 4,433,078

[45] Feb. 21, 1984

[54] WATERDISPERSIBLE CATIONIC RESINS FOR ELECTRODEPOSITION

[75] Inventors: Hilde Kersten, Erlenbach; Hans G. Zengel, Kleinwallstadt, both of Fed. Rep. of Germany; Anton Toth, Creil, France

[73] Assignee: Akzo NV, Arnhem, Netherlands

[21] Appl. No.: 212,671

[22] Filed: Dec. 3, 1980

[30] Foreign Application Priority Data

Apr. 17, 1980 [DE] Fed. Rep. of Germany ....... 3014733

[51] Int. Cl.$^3$ .............................................. C08L 63/08
[52] U.S. Cl. ................................. 523/404; 204/181 C; 523/403; 524/901; 525/524; 525/527
[58] Field of Search .................. 260/18 PN, 29.2 EP; 525/524, 527; 204/181 C; 524/901; 523/403, 404

[56] References Cited

U.S. PATENT DOCUMENTS

| | | | |
|---|---|---|---|
| 2,899,397 | 8/1959 | Aelony et al. | 260/18 PN |
| 3,666,695 | 5/1972 | Jachimowicz et al. | 525/524 |
| 4,134,865 | 1/1979 | Tominaga | 260/29.2 EP |
| 4,139,396 | 2/1979 | Otsuki et al. | 260/29.2 EP |
| 4,274,989 | 6/1981 | Tominaga et al. | 260/29.2 TN |

*Primary Examiner*—Theodore E. Pertilla
*Attorney, Agent, or Firm*—Michael J. Striker

[57] ABSTRACT

Waterdispersible cationic resins are formed by reacting the components comprising at least (A) an epoxidized polydiene,
(B) a bisglycidylether of a polyphenol,
(C) an amide compound, which is formed by one or more higher, substantially multiply unsaturated fatty acids and a polyamine and which may comprise a ketimine group or a hydroxy group, and possibly
(D) an organic secondary amine and/or
(E) a partially and/or fully masked polyisocyanate, which product comprises excess epoxide groups and carbon-carbon double bonds and which resins can be made waterdispersible with an acid under formation of cationic groups. A composite is provided comprising the cationic resin superposed on a conducting substrate and a method is described for forming the composite.

16 Claims, No Drawings

WATERDISPERSIBLE CATIONIC RESINS FOR ELECTRODEPOSITION

BACKGROUND OF THE INVENTION

1. Field of the Invention

This invention relates to novel waterdispersible cationic resins with a specific composition and to their use in the cathodic electrical covering of electrically conducting objects.

2. Brief Description of the Background of the Invention Including Prior Art

For some time the cathodic electrical covering has been performed on an industrial scale. Its principle is to submerge an electrically conducting object into an aqueous dispersion of a cationic polymeric material. The current fed from the electrically conducting and as a cathode acting object through the dispersion to the anode as a counterelectrode effects the deposition at the cathode.

It is disclosed in German Offenlegungsschrift DT-OS No. 2,252,536 to prepare a waterdispersible cationic resin by reacting an organic synthetic resin with epoxy groups with a primary or secondary amine and by reacting the resulting product with a half-masked organic polyisocyanate, wherein this polyisocyanate comprises on the average one free isocyanate group and wherein at room temperature the masked isocyanate groups are stable against said product, but are reacting at elevated temperatures with hydroxy groups.

It has been proposed in German Offenlegungsschrift DT-OS No. 2,541,234 to produce a cationic electrophoretic layer composition by contacting a partially masked polyisocyanate compound with a defined starting material. The starting material is synthesized by reacting an epoxy resin with an aliphatic or alicyclical amino compound, followed by admixing to the resulting reaction product either a polyamide resin or by reacting the resulting reaction product with a polyamide resin.

The conventional resins for electrodeposition at a cathode do not meet their purpose in an optimal way, since the elasticity of the film and the stone impact strength are not fully satisfactory. In addition, in their case also the so-called pin hole formation occurs, which can be recognized under the microscope by hole like recesses and which exerts a negative influence on the corrosion stability. A further weak point is the adhesion of the cataphoretic lacquer to the intermediate lacquer, which requires improvement.

SUMMARY OF THE INVENTION

1. Purposes of the Invention

It is an object of the present invention to provide a waterdispersible cationic resin which results in a highly elastic and high impact strength film.

It is another object of the invention to provide a waterdispersible resin for obtaining a film with low pin hole formation.

It is a further object of the invention to provide a waterdispersible cationic resin yielding films with excellent properties.

These and other objects and advantages of the present invention will become evident from the description which follows.

2. Brief Description of the Invention

The present invention provides cationic resins having polymeric molecules, wherein the polymeric molecules comprise polyalkene and/or polyhaloalkene and/or polycycloalkene derived groups having vicinal functional groups derived from epoxidized double bonds, polyphenol derived groups linked to glycidyl groups by ether oxygen atoms, at least one acid amide group derived from a higher fatty acid and a polyamine, carbon-carbon double bonded groups, and epoxide groups. It is in general possible to substitute in the polyhaloalkene part of the hydogen atoms by halogen atoms and such substituted compositions are part of the present invention. Furthermore it is possible that the polyalkenes are not only either straight chain or branched chain, but they may also include alicyclic rings, which can be unsaturated. All these compounds are meant when the present description employs the expression polyalkenes.

The waterdispersible cationic resins can be put into a form suitable for waterdispersion by providing formation of cationic groups in the presence of an acid. Also the acid amide group can be derived from an amide having a hydroxy and/or ketimine substituent. The waterdispersible cationic resins can have organic molecules comprising groups derived from at least one organic secondary amine such as diethylamine and/or methylethanolamine and/or diethanolamine. The weight ratio of the polyalkylene and/or halopolyalkylene and/or polycycloalkylene derived groups to polyphenol groups linked to glycidyl groups to acid amide groups to secondary amine can be about 1000 to (1000–3000) to (250–3000) to (25–500).

The waterdispersible cationic resins of the present invention can further comprise groups derived from a partially and/or fully masked polyisocyanate. The weight ratio of polyalkylene and/or polyhaloalkylene and/or polycycloalkylene derived groups to polyphenol groups linked to glycidyl groups to acid amide groups to groups derived from organic seondary amines to groups derived from partially and/or fully masked polyisocyanate is about 1000 to (1000–3000) to (250–3000) to (25–500) to (20–3000).

When the waterdispersible resins do not contain groups derived from organic secondary amines the weight ratio of polyalkylene and/or halopolyalkylene and/or polycycloalkylene derived groups to polyphenol derived groups linked to glycidyl groups to acid amide derived groups to groups derived from partially and/or fully masked polyisocyanate can be about 1000 to (1000–3000) to (500–3000) to (20–3000). The partially and/or fully masked polyisocyanate can be 4,4'-diisocyanato-diphenylmethane or toluenediisocyanate reacted with a member of the group consisting of ethyleneglycolmonomethylester, ethyleneglycolmonoethylester, butanol, 2-ethylhexanol-1, 2-hydroxyethylmethacrylate, 2-hydroxypropylmethacrylate and mixtures thereof.

The waterdispersible cationic resins can have as polyalkylene and/or polyhaloalkylene and/or polycycloalkylene derived groups polybutadiene-1,2, polybutadiene-1,4, polybutadiene-(1,2;1,4) derivatives and mixtures thereof. Preferably the polyphenol derived groups are derived from bisphenol A. Preferably, the higher fatty acid can be ricinenic fatty acid and the acid amide groups can be essentially derived from compounds having the structural formula

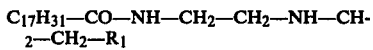

$C_{17}H_{31}$—CO—NH—CH$_2$—CH$_2$—NH—CH$_2$—CH$_2$—R$_1$ wherein $C_{17}H_{31}$ represents the hydrocarbon group of ricinenic acid substantially containing 9,11- and 9,12-octadecadienic acid and $R_1$ represents —NH—CO—$C_{17}H_{31}$, wherein $C_{17}H_{31}$ represents the hydrocarbon group of ricinenic acid, or

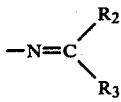

wherein $R_2$ is an alkyl group with from 1 to 2 carbon atoms and wherein $R_3$ is an alkyl group with from 1 to 4 carbon atoms or —OH. More preferably the amide groups are derived substantially from mixtures of compounds of the formula $C_{17}H_{31}$—CO—NH—$CH_2$—$CH_2$—NH—$CH_2$—$CH_2$—NH—CO—$C_{17}H_{34}$ and

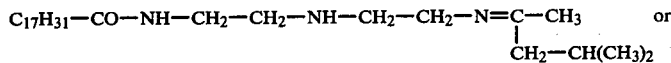

$C_{17}H_{31}$—CO—NH—$CH_2$—$CH_2$—NH—$CH_2$—$CH_2$—NH—CO—$C_{17}H_{31}$ and $C_{17}H_{31}$—CO—NH—$CH_2$—$CH_2$—NH—$CH_2$—$CH_2$—OH wherein $C_{17}H_{31}$ represents the hydrocarbon group of ricinenic acid.

Preferred higher fatty acids are further based on linseed fatty acids and the acid amide groups are derived from compounds having the structural formula $R_1$—CO—NH—$CH_2$—$CH_2$—NH—$CH_2$—$CH_2$—$R_2$ wherein $R_1$ represents the hydrocarbon group of the acids substantially contained in linseed fatty acids including linolenic acid, linolic acid and oleic acid and wherein $R_2$ represents —NH—CO—$R_1$, wherein $R_1$ represents the hydrocarbon group of the acids substantially contained in linseed fatty acids or

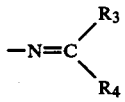

wherein $R_3$ is an alkyl group with 1 to 2 carbon atoms and $R_4$ is an alkyl group with from 1 to 4 carbon atoms or —OH. Preferably, the weight ratio of polyalkylene and/or polyhaloalkylene and/or polycycloalkylene derived groups to polyphenol derived groups linked to glycidyl groups to acid amide derived groups is about 1000 to (1000–3000) to (500–3000).

The waterdispersible cationic resins are formed by reacting the components comprising at least
(A) an epoxidized polydiene,
(B) a bisglycidylether of a polyphenol,
(C) an acid amide compound formed from at least one higher substantially multiply unsaturated fatty acid, wherein the reaction product comprises excess epoxide groups and double carbon-carbon bonds. The resins can be rendered waterdispersible with an acid, which forms cationic groups. The acid amide compound can comprise at least in part a ketimine group and/or a hydroxy group.

The reaction components can further comprise (D) an organic secondary amine such as diethylamine and/or methylethanolamine and/or diethanolamine. The weight ratios of the components (A) to (B) to (C) to (D) can be about 1000 to (1000–3000) to (250–3000) to (25–500) and the epoxide content of (A) can be from about 2 to 7 of epoxy equivalents per 1000 g of component (A) and the epoxide content of (B) can be from about 1 to 6 of epoxy equivalents per 1000 g of component (B).

The reacting components can further comprise (E) a partially and/or fully masked polyisocyanate. Then the weight ratio of the components (A) to (B) to (C) to (D) to (E) can be about 1000 to (1000–3000) to (250–3000) to (25–500) to (20–3000) and the epoxide content of (A) can be from about 2 to 7 of epoxy equivalents per 1000 g of component (A) and the epoxide content of (B) can be from about 1 to 6 of epoxy equivalents per 1000 g of component (B). In case no organic secondary amine component is present the weight ratio of the components (A) to (B) to (C) to (E) can be about 1000 to (1000–3000) to (500–3000) to (20–3000) and the epoxide content of (A) can be from about 2 to 7 of epoxy equivalents per 1000 g of component (A) and the epoxide content of (B) can be from about 1 to 6 of epoxy equivalents per 1000 g of component (B).

Preferably the partially and/or fully masked polyisocyanate (E) is 4,4'-diisocyanatodiphenylmethane or toluenediisocyanate reacted with a member of the group consisting of ethyleneglycolmonomethylester, ethyleneglycolmonoethylester, butanol, 2-hexylethanol-1, 2-hydroxyethylmethacrylate, 2-hydroxypropylmethacrylate and mixtures thereof. The component (A) can comprise a member of the group consisting of epoxypolybutadiene-1,2, epoxypolybutadiene-1,4, epoxypolybutadiene with both 1,2 and 1,4 coupling and mixtures thereof. The component (B) can be a bisglycidylether of bisphenol A. Preferably, the component (C) is based on ricinenic fatty acids and the acid amides substantially comprise compounds of the formula $C_{17}H_{31}$—CO—NH—$CH_2$—$CH_2$—NH—$CH_2$—$CH_2$—$R_1$ wherein the $C_{17}H_{31}$ represents the hydrocarbon group of ricinenic acid substantially containing 9,11- and 9,12-octadecadienic acid and $R_1$ represents —NH—CO—$C_{17}H_{31}$, wherein $C_{17}H_{31}$ represents the hydrocarbon group of ricinenic acid, or

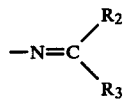

wherein $R_2$ is an alkyl group with from 1 to 2 carbon atoms and wherein $R_3$ is an alkyl group with from 1 to 4 carbon atoms or —OH. Component (C) can substantially comprise mixtures of compounds having the formulas $C_{17}H_{31}$—CO—NH—CH$_2$—CH$_2$—NH—CH$_2$—CH$_2$—NH—CO—$C_{17}H_{31}$ and

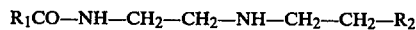

$C_{17}H_{31}$—CO—NH—CH$_2$—CH$_2$—NH—CH$_2$—CH$_2$—NH—CO—$C_{17}H_{31}$ and $C_{17}H_{31}$—CO—NH—CH$_2$—CH$_2$—NH—CH$_2$—CH$_2$—OH wherein $C_{17}H_{31}$ represents the hydrocarbon group of ricinenic acid substantially containing 9,11- and 9,12-octadecadienic acid.

It is further preferred when the component (C) is based on linseed fatty acids and when the acid amides substantially contain compounds having the formula $R_1CO$—NH—CH$_2$—CH$_2$—NH—CH$_2$—CH$_2$—$R_2$ wherein $R_1$ represents the hydrocarbon group of the acids substantially contained in linseed fatty acids including linolenic acid, linolic acid and oleic acid and wherein $R_2$ represents —NH—CO—$R_1$, wherein $R_1$ represents the hydrocarbon group of the acids substantially contained in linseed fatty acids, or

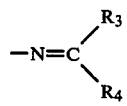

wherein $R_3$ is an alkyl group with from 1 to 2 carbon atoms and wherein $R_4$ is an alkyl group with from 1 to 4 carbon atoms or —OH.

The weight ratio of the components (A) to (B) to (C) can be from about 1000 to (1000-3000) to (500-3000) and the epoxide content of (A) can be from about 2 to 7 of epoxy equivalents per 1000 g of component (A) and the epoxide content of (B) can be from about 1 to 6 of epoxy equivalents per 1000 g of component (B).

The waterdispersible cationic resins can further comprise in addition to acids water in a weight ratio of water to the cationic resin of from about 3 to 20. Preferred cured pieces result when the waterdispersible cationic resins are baked at temperature of from about 150° to 200° C.

There is also provided by the present invention a composite comprising an electrically conducting substrate and a superposed layer of a polymer wherein the polymer comprises polyalkene and/or polyhaloalkene and/or polycycloalkene derived groups having vicinal functional groups derived from epoxidized double carbon-carbon bonds, polyphenol derived groups linked to glycidyl derived groups by ether oxygen atoms, and at least one acid amide derived from a higher fatty acid and a polyamine. The conducting substrate can be a metal. Preferred composites result after baking at a temperature from about 150° C. to 200° C.

The present invention also provides a method for preparing a waterdispersible cationic resin which comprises reacting components comprising at least (A) an epoxidized polydiene, (B) a bisglycidylether of a polyphenol and (C) an acid amide compound formed from at least one higher substantially multiply unsaturated fatty acid. The reacting components can further comprise (D) an organic secondary amine and/or (E) a partially and/or fully masked polyisocyanate.

There is further provided a method for covering an electrically conducting substrate which comprises contacting the substrate with an aqueous dispersion of a water-dispersible cationic resin having polymeric molecules wherein the polymeric molecules comprise polyalkene and/or polyhaloalkene and/or poly cycloalkene derived groups having vicinal functional groups derived from epoxidized double bonds, polyphenol derived groups linked to glycidyl derived groups by ether oxygen atoms, at least one acid amide group derived from a higher fatty acid and a polyamine, carbon-carbon double bonded groups and epoxide groups; contacting an anode with said aqueous dispersion and passing electrical current through the substrate serving as an anode, the aqueous dispersion and the anode. The electrically conducting substrate can be a metal piece and the polymeric molecules can further comprise groups derived from at least one secondary amine and/or groups derived from a partially and/or fully masked polyisocyanate. The aqueous dispersion can also comprise a member of the group consisting of pigments based on heavy metal compounds, siccatives based on naphthenates, oleates or acetates of heavy metal compounds or mixtures thereof. The aqueous dispersion can comprise lead compounds. Preferably the method comprises the additional step of baking the covered electrically conducting substrate at a temperature of from about 150° C. to 200° C.

The invention accordingly consists in the combination of elements and series of steps, which will be exemplified in the compositions of matter and methods hereinafter described and of which the scope of application will be indicated in the appended claims.

DESCRIPTION OF INVENTION AND PREFERRED EMBODIMENTS

In accordance with the present invention, waterdispersible cationic resins are provided, which are the reaction product of at least (A) an epoxidized polydiene,
(B) a bisglycidylether of a polyphenol,
(C) an amide compound, which is formed by one or more higher, substantially multiply unsaturated fatty acids and a polyamine and which may comprise a ketimine group or a hydroxy group, and possibly
(D) an organic secondary amine and/or
(E) a partially and/or fully masked polyisocyanate, which product comprises excess epoxide groups and carbon-carbon double bonds and which resins can be made waterdispersible with an acid under formation of cationic groups.

In the present invention there are employed as epoxidized polydienes the following defined materials, which contain such an amount of epoxide in the molecule that the resulting synthesized cationic resins are provided with excess epoxide groups. They have a relatively high molecular weight of at least 400, and in general from about 500 to 6000. Chemically speaking, the epoxidized polydienes are derived from a homopolymer or a copolymer of one or more alkadienes. The alkadienes employed have preferably from about 4 to 20 carbon atoms and more preferred are those having from about 4 to 8 carbon atoms. Alkadienes as the expression is employed in the present invention shall also comprise alkadienes wherein some of the hydrogen atoms are substituted by halogen including fluorine, chlorine, bromine and iodine as well as alkadienes wherein the carbon atoms form a ring and which can be considered as cycloalkadienes. Thus the resulting copolymers can comprise cycloalkadienes such as cyclopentadiene or dicyclopentadiene. As examples of suitable alkadienes are cited the following: 1,2-butadiene, 1,3-butadiene, isoprene, chloroprene, 1,3-pentadiene, 1,4-pentadiene and 1,4 hexadiene. The alkadiene homo and copolymers, respectively, as known in the art are epoxidized in conventional manner such that the resulting reaction product has a contents of epoxy equivalents per 1000 g of at least 2. The grouping

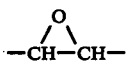

is considered as epoxy group. Particularly advantageous for the synthesis of waterdispersible cationic resins is the employment of epoxypolybutadiene-1,2 and epoxypolybutadiene-1,4 polymers as well as the epoxy compounds of a polybutadiene with 1,2 and 1,4 coupling.

The bisglycidylethers of a polyphenol employed in the present invention are generally known and for example can be prepared by etherification of a polyphenol with epichlorohydrin or dichlorohydrin in the presence of alkali. Suitable polyphenols include for example bisphenol A (=2,2-bis[4-hydroxyphenyl]propane), bis(4-hydroxyphenyl)butane, 4,4-dihydroxybenzophenone, bis(4-hydroxyphenyl)-1,1-ethane, bis(4-hydroxyphenyl)-1,1-isobutane, bis(2-hydroxynaphthyl)methane and 1,5-hydroxynaphthalene. Preferably, the polyphenols have from about 11 to 30 carbon atoms and more preferred are those having from 11 to 20 carbon atoms. The bisglycidylethers of a polyphenol employed can be monomeric or polymeric compounds or a mixture thereof and the average number of the epoxide groups per molecule is usually larger than 1. For synthesizing the waterdispersible cationic resins of the present invention bisplycidylethers of bisphenol A are preferred, which have from about 1 to 6 of epoxy equivalents per 1000 g.

The amide compounds employed in accordance with the present invention are derived with respect to their acid component from higher, essentially multiply unsaturated fatty acids. Examples of multiply unsaturated fatty acids present in natural oils such as linseed oil, tall oil and castor oil as fatty acid derivatives are 9,11-octadecadienic acid, 9,12-octadecadienic acid, linolic acid, linolenic acid, α-eleostearic acid and β-eleostearic acid. Preferred fatty acids include those having from about 12 to 20 carbon atoms and having at least one double bond in the hydrocarbon chain. More preferred are fatty acids having from about 16 to 18 carbon atoms and at least two carbon-carbon double bonds. Of course also corresponding and similar synthetic fatty acids can be employed as starting materials. For economic reasons it is preferred to employ the commercially available mixtures of such acids, which contain in small amounts also simply unsaturated and saturated fatty acids.

Especially ricinenic fatty acids are suitable as acid component for the amide compounds employed in the present invention. These represent mixtures of dehydrated castor oil fatty acids and consist essentially of 9,11- and 9,12-octadecadienic acid (ricineneic acid) and about 5 to 7 weight percent of oleic acid and about 3 to 5 weight percent of saturated fatty acids. Similarly, the linseed fatty acids are also suitable. They represent mixtures from linolenic acid (about 38 weight percent), linolic acid (about 42 weight percent), oleic acid (about 10 weight percent), stearic acid (about 3 weight percent) and palmitic acid (about 7 weight percent), wherein of course the percentage composition can vary within certain limits. The present invention allows to employ mixtures containing up to about 30 weight percent of the fatty acids as simply unsaturated or saturated fatty acids, wherein the simply unsaturated fatty acids predominate.

The amide compounds employed in the present invention are derived with respect to their amine component from amines with at least one primary amino group and at least one secondary amino group. These amines can also comprise an OH-group. As examples of such amines are cited the following: diethylenetriamine, triethylenetetramine, tetraethylenepentamine, methylaminopropylamine, tetrapropylenepentamine, pentaethylenehexamine, N,N'-bis-(3-aminopropyl)-ethylenediamine, N-(2-aminoethyl)-aminopropylamine, 3-amino-1-methylaminopropane, 3-amino-1-cyclohexylaminopropane, N-oleyl-1,3-diaminopropane, N-dodecyl-1,3-diaminopropane, N-cetyl-1,3-diaminopropane, 1-(2-aminoethyl)-piperazine, N-(2-hydroxyethyl)-aminoethylamine. The amines preferably have from about 3 to 30 carbon atoms and from about 2 to 10 nitrogen atoms and more preferred are amines having from 4 to 12 carbon atoms and two to 4 nitrogen atoms.

The amide compounds formed from at least one or more higher, essentially multiply unsaturated fatty acids and from a polyamine cannot only comprise a hydroxy group but also a ketimine group. A primary amino group of the polyamine compounds employed in the synthesis of the amides used in the present invention can be transformed into a Schiff base by reaction with ketones and then be employed as a starting material of the present invention. It is particularly advantageous when the component (C) is based on ricinenic fatty acids and the amino compound essentially consists of compounds having the following structural formula

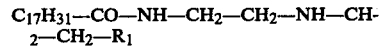

wherein $C_{17}H_{31}$ represents the hydrocarbon group of the 9,11- and 9,12-octadecadienic acid substantially contained in the ricinenic fatty acids and wherein $R_1 = -NH-CO-C_{17}H_{31}$, wherein $C_{17}H_{31}$ represents the hydrocarbon group of ricinenic acid, or

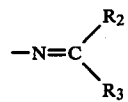

wherein $R_2$ is an alkyl group with from 1 to 2 carbon atoms and wherein $R_3$ is an alkyl group with from 1 to 4 carbon atoms or —OH.

A partial blocking of a primary amino group in the specific ricinenic acid amides by way of ketones such as for example methylisobutylketone, diethylketone, dipropylketone, dibutylketone, phenylmethylketone, cyclohexanone, improves after splitting off of the blocking agent the solubility in water and the films are harder after baking. Preferred properties are in particular obtained in this regard with resins wherein in the synthesis the component (C) substantially comprises mixtures of the compounds $C_{17}H_{31}$—CO—NH—$CH_2$—$CH_2$—NH—$CH_2$—$CH_2$—NH—CO—$C_{17}H_{31}$ and

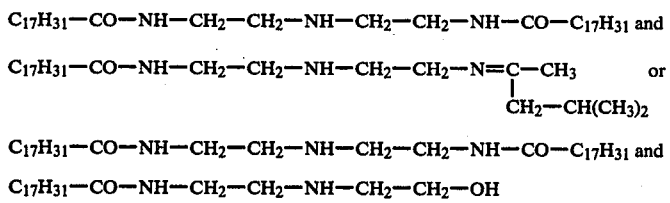

$C_{17}H_{31}$—CO—NH—$CH_2$—$CH_2$—NH—$CH_2$—$CH_2$—NH—CO—$C_{17}H_{31}$ and $C_{17}H_{31}$—CO—NH—$CH_2$—$CH_2$—NH—$CH_2$—$CH_2$—OH wherein $C_{17}H_{31}$ represents the hydrocarbon group of ricinenic acid. The mole ratio of the individual components in such materials mixtures can vary over a wide range and amounts to about 40:60 to 80:20 mole percent in general.

Good results are also obtained when the acid component of the amides employed in accordance with the present invention is a linseed fatty acid. Thus in a further embodiment of the present invention the component (C) is based on linseed fatty acids and the amide compounds comprise substantially compounds having the structural formula

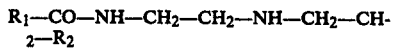

wherein $R_1$ represents the hydrocarbon group of the acids substantially contained in linseed fatty acids including linolenic acid, linolic acid and oleic acid and wherein $R_2$ represents —NH—CO—$R_1$, wherein $R_1$ represents the hydrocarbon group of the acids substantially contained in linseed fatty acids, or

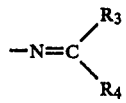

wherein $R_3$ is an alkyl group with from 1 to 2 carbon atoms and wherein $R_4$ is an alkyl group with from 1 to 4 carbon atoms or —OH. The saturated acids such as stearic acid and palmitic acid contained in amounts of up to about 10 weight percent in the linseed fatty acids do not exert a negative influence in this amount in the composition.

Organic secondary amines, which possibly contain a hydroxy group, are employed as a fourth reaction component (D) in the synthesis of the cationic resins of the present invention. As examples of suitable compounds are cited the following: diethanolamine, methylethanolamine, diethylamine, dimethylamine, dipropylamine, bis-(2-hydroxypropyl)-amine, bis-(3-hydroxypropyl)-amine, bis-(2-hydroxybutyl)-amine, bis-(3-hydroxybutyl)-amine, bis-(4-hydroxybutyl)-amine and bis-(2-hydroxy-2-methylpropyl)-amine. Preferred secondary amines have from about 1 to 20 carbon atoms and more preferred amines can have from about 1 to 8 carbon atoms. Not only individual compounds as such can be employed, but also mixtures of for example two or three of the secondary amines useful in the present invention. Preferred organic secondary amines are in particular diethylamine and/or methylethanolamine and/or diethanolamine for the synthesis of the present invention.

In one aspect, the present invention provides for the production of good waterdispersible resins by the joint reaction of the above described three or four groups of starting components (A), (B), (C) or (A), (B), (C) and (D) and there is no need for the conventionally usual polyisocyanate hardening. It is indispensible in the simultaneous reaction of three or four starting materials components to select the reaction temperature sufficiently high for inducing a reaction of the less reactive epoxidized polydienes with the other reaction components. Therefor in general the reaction temperatures are from about 100° C. to 150° C. and they are preferably in the range of from about 120° C. to 140° C.

The properties of the resulting resins vary with the weight or molar ratios, respectively, of the three or four groups of starting components, each of which providing special properties to the final product. For example the employed epoxidized polydienes and the amides of ricinenic acid from polyamines and their derivatives effect for example on the one hand an improvement of film elasticity, an improvement of the breakdown voltage and the avoidance of the undesired pin holes formation and thus act as plasticizers. On the other hand too large amounts of these components result in films which are too thick and too soft. The employment of bisglycidylethers of one or more polyphenols, which act as hardeners, results in the presence of large amounts in films of higher hardness and of lower thickness, however the films are brittle and thereby the capability of binding to the above disposed lacquer decreases. In addition, the breakdown voltage is lower.

While of course the weight ratios of the cited starting components can be differently varied depending on the chemical constitution of the individual components employed in each case, as a rule a desirable range of weight ratios of the components (A):(B):(C) is about 1000 to (1000–3000) to (500–3000) and the epoxide content of (A) is from about 2 to 7 of epoxy equivalents per 1000 g of component (A) and the expoxide content of (B) is from about 1 to 6 of epoxy equivalents per 1000 g of component (B). In case the four components (A), (B), (C), and (D) are employed in the formation of the resin, then the weight ratio is about 1000 to (1000–3000) to (250–3000) to (25–500) and the epoxide content of (A) is from about 2 to 7 of epoxy equivalents per 1000 g of component (A) and the epoxide content of (B) is from about 1 to 6 of epoxy equivalents per 1000 g of component (B). The aminogroups of the such prepared resins are transformed with water and an acid at least in part, preferably from about 20 to 90 mole percent and more preferred from about 50 to 80 mole percent and for example by 30, 50, 70 or 80 mole percent, to amino salt groups and thereby the resin is rendered water dispersible. This is effected in conventional manner with an inorganic, organic, complexforming or noncomplexforming acid. Examples of suitable acids include carbonic acids such as formic acid, acetic acid, and propionic acid, phosphoric acid, sulfuric acid, glycolic acid, lactic acid and tartaric acid. Preferably such carbon containing acids have from about 1 to 5 carbon atoms. After this reaction the product usually has a solids content of from about 60 to 80 weight percent and is then thinned down with water to a concentration of from about 5 to 25 weight percent usually employed in practical applications.

The aqueous medium can comprise in addition to water other solvents for improving the solubility of the resin. Such solvents include for example esters such as acetic acid ethyl ester or the monomethyl-, monoethyl-, monobutyl- and monohexyl-ethers of the ethyleneglycolacetates, or ketones such as diethylketone or methylisobutylketone. The amount employed of such solvents is not particularly critical and ranges in general from about 5 to 25 weight percent relative to the total weight of the aqueous medium.

The coating compound ready for application is contacted with an anode and the electrically conducting substrate to be coated, which substrate acts as a cathode. The voltage employed for deposition at the cathode usually amounts to from about 150 to 400 volts and the initial current density is from about 1 to 20 amperes per 100 square centimeters. The cited conditions are thus in general similar to those usually employed in the deposition of other cationic resins.

The hardening of the cataphoretic resins of the present invention occurs already below 180° C. by self cross-linking, thus an additional isocyanate hardening is not necessary. The crosslinking occurs solely via excess epoxide groups and via double bonds. Especially the double bonds of the ricinenic acids, but also the isolated double bonds of the otherwise multiply unsaturated fatty acids as well as of the polydiene support herein the epoxide crosslinking and good corrosion resistance can be obtained. The corrosion resistance can further be enhanced by incorporating into the aqueous coating mass the usually added pigments especially those based on heavy metal compounds as titanium dioxide, lead chromate, lead silicate and strontium chromate in the form of a pigment paste. It has also been found that the presence of siccatives based on naphthenates, oleates or acetates of heavy metal compounds such as of cobalt, manganese, lead or zinc in amounts of from about 1 to 10 weight percent relative to the weight of the resin further increases and supports, respectively, crosslinking such that on this basis or in combination with the above cited pigments even better corrosion resistances can be obtained. Very effective in this respect are the corresponding lead compounds.

In a further aspect of the present invention a partially and/or fully masked polyisocyanate is coemployed as a fifth reaction component in the cataphoretically deposited resins of the present invention. The free isocyanate groups of the partially masked polyisocyanate react herein with the reaction product from the above cited components (A), (B), (C) or (A), (B), (C), and (D), respectively, while the masked isocyanate groups of the partially and/or fully masked polyisocyanates do not react with the active hydrogen atoms of the resin at this stage. Only when the resin covering the substrate is heated to a higher temperature sufficient to lift the masking of the polyisocyanate, then hardening occurs by the corresponding crosslinking reaction.

The reaction between the partially masked polyisocyanate and the reaction product of the components (A), (B), (C) or (A), (B), (C) and (D), respectively, is performed at low or moderate temperature. The temperature is usually below 100° C. and preferably below 80° C. This insures that the masked isocyanate groups are not deblocked and that the resin does not gel and the latent crosslinking points in the resin remain intact.

In the preparation of the masked polyisocyanates in principle all organic polyisocyanates are suitable. Typical examples for aliphatic polyisocyanates include for example trimethylene-, tetramethylene-, trimethylhexamethylene- and hexamethylene-diisocyanate. For example isophoronediisocyanate is cited as an alicyclic polyisocyanate.

Suitable aromatic polyisocyanates include for example 1,4-diisocyanatobenzene, 1,5-diisocyanatonaphthalene, 4,4'-diisocyanatodiphenylmethane, 2,4- and 2,6-diisocyanatotoluene, both in particular as a mixture, and 2,4,6-triisocyanatotoluene.

In principle, all compounds known and suitable for the purpose can be employed for masking and such compounds comprise hydroxy groups such as arbitrary primary, secondary and tertiary aliphatic, cycloaliphatic and aromatic monoalcohols. Such alcohols have preferably from about 1 to 20 carbon atom and more preferred are those having from about 2 to 8 carbon atoms. As examples the following compounds are cited: ethanol, butanols, 2-ethylhexanol, glycolmonomethylether, ethyleneglycolmonoethylether, 2-hydroxyethylmethacrylate, 2-hydroxypropylmethacrylate, cyclohexanol, phenylcarbinol and methylphenylcarbinol. Also phenolic compound such as phenol itself and substituted phenols, wherein the substitutents do not negatively influence the employment of the resins as coating compounds, can be employed as masking materials such as for example cresoles, nitrophenol, chlorophenol and ethylphenol. As additional masking agents are suitable also oximes such as methylethyloxime, acetoneoxime and cyclohexanoneoxime and lactames such as $\epsilon$-caprolactame. In the last named compounds it has to be considered that the thus masked polyisocyanates demask and react already at relatively low temperatures.

The reaction between the organic polyisocyanate and the masking agent is, as is known, usually an exothermic reaction. Therefor, the polyisocyanate and the masking agent are preferably mixed at temperatures below 60° C. in order to minimize the exothermic effects. It is preferred in accordance with the present invention to employ as partially masked polyisocyanates 4,4'-diisocyanatodiphenylmethane and/or toluenediisocyanate reacted with glycolmonomethylether, e.g. ethylene glycol monomethyl ether, glycolmonoethylether, e.g. ethylene glycol monoethyl ether, butanols, 2-ethylhexanol-1, 2-hydroxyethylmethacrylate or 2-hydroxypropylmethacrylate. Particularly suitable are cationic resins wherein the weight ratio of the components (A) to (B) to (C) to (D) to (E) is about 1000 to (1000–3000) to (250–3000) to (25–500) to (20–3000) and wherein the epoxide content of (A) is from about 2 to 7 of epoxy equivalents per 1000 g of component (A) and the epoxide content of (B) is from about 1 to 6 of epoxy equivalents per 1000 g of component (B). Although in accordance with the present invention the employment of the partially and/or fully masked polyisocyanates is not necessarily required, an additional polyisocyanate cross-linking is particularly advantageous in cases where the concentration of the excess epoxide groups and of the double carbon-carbon bonds in the cationic resin is in the lower range of the present invention.

Also, in the case of employing the partially and/or fully masked polyisocyanates, the aqueous coating composition can comprise the usual auxiliary materials and additives such as surface active materials, antisetting agents, anti-oxidants, pigments and coloring agents. The hardening can further be favored by pigments based on heavy metal compounds such as white lead colors, zinc oxides, lithopone, titaniumdioxide pigments, iron oxide black, manganese black, cobalt black, zinc yellow, zinc green, cadmium yellow, cadmium red, manganese and cobalt colors, pigments of the copper group, lead group, chromium group and iron group. As mentioned above, this holds in particular for the addition of siccatives based on naphthenates, oleates and acetates of heavy metal compounds which possibly can be employed in combination with pigments based on heavy metal compounds.

After the coating of the substrate as described above with the coating composition the composite is similarly to conventional processes washed, dried and then heated to temperatures of from about 150° to 200° C. The substrate is usually from steel, iron, aluminum or a metal alloy. The time of the heating or hardening, respectively, depends on the temperature and is usually from about 10 to 40 minutes.

The invention is further illustrated by way of the following examples: The lead pencil hardness indicated in the examples was determined by the usual lead pencil scratch method. It is described in "Laboratoriumsbuch fuer Lack-und Anstrichmittel-Industrie" by Zeidler-Bleisch (Publisher: Wilhelm Knapp-Verlag, Duesseldorf, 3rd edition 1967) on page 298. The salt spray test described in the examples was performed in accordance with SK-DIN-50 017.

I. Preparation of Certain Starting Materials

1. Preparation of di-(ricinenicamido-ethylene)-amine ($C_1$)   $H_{31}C_{17}$—CO—NH—$CH_2$—$CH_2$—NH—$CH_2$—$CH_2$—NH—CO—$C_{17}H_{31}$ 103 g (1 mole) of diethylenetriamine were added drop by drop to 540 g (2 moles) of ricinenic acid dissolved in methanol. Then the solvent was distilled off and the reaction mixture was heated to about 180° C. of a bath under distilling off of the split-off water. The diamide was obtained in practically quantitative yields.

2. Preparation of a mixture of 80 mole percent $C_1$ and 20 mole percent of the methylisobutylketimines of the ricinenic amidoethyl-aminoethylamine.

$C_2$ = 80 mole percent $C_1$ + 20 mole percent

-continued

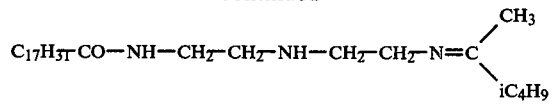

The composition comprised the following components:
729 g (2.7 mole) ricinenic acid dissolved in 600 ml methanol.
154 g (1.5 mole) diethylenetriamine dissolved in 150 ml methanol,
150 g methylisobutylketone and
375 ml toluene.

The ricinenic acid dissolved in methanol was placed in a flask and under agitation the diethylenetriamine solution was added. The methanol was withdrawn from the resulting amine salt under vacuo and under weak nitrogen purging the liquid was heated to an oil bath temperature of 180° C., while under splitting off of water the amide formed. The water was distilled off during the reaction. The liquid was then cooled to 100° C. for blocking of the remaining primary amino groups, then toluene and methylisobutylketone were added followed by heating in the presence of a water separator under reflux as long until no further water passed over, which was the case after about three hours. Then the toluene and the excess methylisobutylketone were withdrawn under vacuo. The remaining residue had an amine number of about 100. The yield was about 1750 g. The product had an average molecular weight of 573.1.

By way of an analog process the mixtures of the following compound types

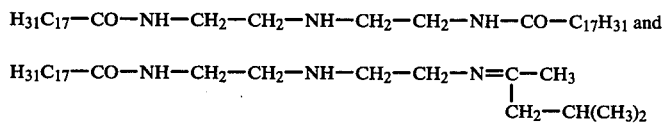

were prepared in other molar ratios ($C_3$). Also in analog manner the mixtures of the reaction products of the mixed fatty acids of the linseed oil with diethylenetriamine and methylisobutylketone were prepared in various molar ratios ($C_5$).

3. Preparation of a mixture of 50 mole percent $C_1$ and 50 mole percent ricinenicamidoethyl-hydroxyethylamine.

$C_4$ = 50 mole% $C_1$ + 50 mole %

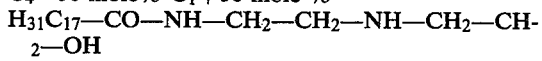

A mixture of 16.3 g (0.1 mole) of diethylenetriamine and 10.4 g (0.1 mole) N-aminoethyl-ethanolamine were added drop by drop to 81 g (0.3 mole) ricinenic acid in methanol. The solvent was distilled off and the reaction mixture was heated to about 180° C. for splitting off the water and the split off water was distilled off. The mixture was obtained in quantitative yield.

4. Blocking of the diisocyanate with monoalcohols.

Diisocyanate dissolved in waterfree acetic acid ethylester (with an equilibrium ratio of about 1:2) was placed in a round flask and under weak nitrogen purging the alcohol was added drop by drop during about 20 minutes under waterbath cooling. The mole ratio of diisocyanate to alcohol was variably selected (see Table). In general, it is about 1:1.1 to 1:1.4. Then the liquid was heated for about 30 minutes under stirring to about 50° C. The acetic acid ethylester was withdrawn in vacuo at a maximum bath temperature of about 50° C. The yield was quantitative and the NCO contents corresponded to the theoretical values.

II. Resin Preparation

1. Preparation of waterdispersible cationic resins without application of a masked polyisocyanate (Table 1)

The process of preparation of the following 15 resins listed by the starting compositions (Table 1) and giving the deposition conditions was as follows:

The epoxide components 1,2-polybutadiene epoxide and the glycidylether of the bisphenol A were placed in a vessel and heated to about 120° to 130° C. Within 5 minutes the amide component $C_1$, $C_2$ or $C_3$ or the mixture of the amide components $C_1$, $C_2$, $C_3$ or $C_5$, respectively and the amine $D_1$, $D_2$ or $D_3$ were added drop by drop and allowed for about 5 to 10 minutes to afterreact at 130° C. The liquid was cooled and at 70° C. the solvent was added under vigorous stirring followed by adding of water and acetic acid such that the amines were only partially neutralized (see Table) and a suspension with a solids content of 70–80 or 10 to 20% resulted.

TABLE 1

Cationic Resins from the Epoxycompounds A and B and the Fatty Acid Amides of Diethylenetriamine C and possibly Amines D.

| Nr. | $A_1$ | $B_1$ | $C_1$ | $C_2$ | $C_3$ | $C_5$ | $D_1$ | $D_2$ | $D_3$ | 11* | | 12* | 13* | 14* | 15* | 16* | 17* |
|---|---|---|---|---|---|---|---|---|---|---|---|---|---|---|---|---|---|
| 1 | 10 | 20 | | | 15.1 | | | | | | | — | 20 | 50 | 300 | 25 | 9 H |
| 2 | 10 | 30 | | 17.2 | | | | | | | | | 40 | 80 | 300 | 28 | 4 H |
| 3 | 10 | 20 | 12.1 | | | | | | | Pb—oleate | 5 | | 40 | 80 | 300 | 30 | 4 H |
| 4 | 10 | 20 | 12.1 | | | | 0.75 | | | | | | 50 | 80 | 300 | 23 | 3 H |
| | | | | | | | | | | +Pb—acetate | 5 | | | | 300 | 25 | 5 H |
| 5 | 10 | 20 | | 11.5 | | | | | 1.05 | | | | 60 | 80 | 300 | 15 | 3 H |
| 6 | 10 | 15 | | 11.5 | | | | | 1.05 | | | | 50 | 80 | 300 | 25 | 3 H |
| 7 | 10 | 20 | | 11.5 | | | 1.12 | | | | | | 40 | 80 | 200 | 15 | 3 H |
| | | | | | | | | | | +Pb—naphthenate | 5 | | | | 200 | 20 | 5 H |
| 8 | 10 | 20 | | 11.5 | | | 0.75 | | | | | | 50 | 80 | 300 | 22 | 4 H |
| 9 | 10 | 20 | | 17.2 | | | 0.75 | | | | | | — | 70 | 300 | 35 | H |
| 10 | 10 | 20 | | | 10.1 | | 0.75 | | | | | | 20 | 50 | 200 | 30 | 2 H |
| 11 | 10 | 20 | | | 10.1 | | | 0.73 | | | | | 20 | 50 | 300 | 25 | 5 H |
| 12 | 10 | 20 | | | 10.1 | | | | 1.05 | | | | 20 | 50 | 300 | 30 | 5 H |
| 13 | 10 | 20 | | | 15.1 | | 0.75 | | | | | | — | 80 | 300 | 40 | 2 H |
| 14 | 10 | 20 | 12.1 | | | | 0.75 | | | | | | 50 | 80 | 300 | 23 | B |
| | | | | | | | | | | +Pb—acetate | 5 | | | | 300 | 30 | 6 H |
| 15 | 10 | 20 | | | | 10 | | | 1.05 | | | | 20 | 50 | 300 | 17 | 9 H |

Meaning of the abbreviations in Table 1
A = Epoxypolybutadiene - Nisso BF-1000 = commercial product of Nippon Soda, epoxidized 1,2-polybutadiene, molecular weight 1100, epoxide content = 8%,
$B_1$ = Epikote 1001, commercial product of Shell AG, bisglycidylether of bisphenol A and its polymers, respectively, epoxide value (epoxy equivalents/100 g) 0.2–0.225, molecular weight 900 to 1000,
$B_2$ = Epikote 828, commercial product of Shell AG, bisglycidylether of bisphenol A and its polymers, respectively, epoxide value 0.51–0.56, molecular weight 350–400,
$C_1$ = Di-(ricinenicamidoethyl-)amine
$C_2$ = 80 mole percent di-(ricinenicamidoethyl-)amine + 20 mole percent methylisobutylketimine of the ricinenicamidoethyl-aminoethyl-amine,
$C_3$ = 40 mole percent di-(ricinenicamidoethyl-)amine + 60 mole percent methylisobutylketimine of the ricinenicamidoethyl-aminoethyl-amine,
$C_4$ = 50 mole percent di-(ricinenicamidoethyl-)amine + 50 mole percent ricinenicamidoethyl-hydroxyethyl-amine,
$C_5$ = 40 mole percent di(aminoethyl)amine of the linseed fatty acids + 60 mole percent methylisobutylketimine of the amidoethyl(of the linseed fatty acids)-aminoethyl-amine,
$D_1$ = Methylethanolamine,
$D_2$ = Diethylamine,
$D_3$ = Diethanolamine.
11* = Type of additive
12* = weight percentage of additive relative to solids
13* = weight percentage of cellosolveacetate relative to solids,
14* = mole percentage of acetic acid relative to tertiary amine
15* = deposition voltage
16* = layer thickness [μm]
17* = lead pencil hardness

TABLE 2

Cationic Resins from the Epoxidecompounds A and B, the Fatty Acid Amides of the Diethylenetriamine C, the Masked Diisocyanate E and possibly the Amines D.

| Nr. | A | $B_1$ | $B_2$ | $C_2$ | $C_3$ | $C_4$ | $C_5$ | $D_1$ | $D_2$ | $D_3$ | 21* | Blocking agent | 30* | 31* | 32* | 33* | 34* | 35* | 36* |
|---|---|---|---|---|---|---|---|---|---|---|---|---|---|---|---|---|---|---|---|
| 1 | 10 | 20 | | | 15.1 | | | | | | TDI | 24* | 1:1.2 | 10 | 20 | 50 | 300 | 30 | 5 H |
| 2 | 10 | 20 | | 11.5 | | | | | 0.75 | | TDI | 26* | 1:1.1 | 8 | 40 | 80 | 300 | 16 | 4 H |
| 3 | 10 | 20 | | | 10.1 | | | 0.75 | | | TDI | 25* | 1:1.1 | 10 | 40 | 80 | 300 | 22 | 4 H |
| 4 | 10 | 20 | | | | 9.7 | | 0.75 | | | TDI | 25* | 1:1.4 | 20 | 40 | 80 | 300 | 32 | 3 H |
| 5 | 10 | 20 | | | | 9.7 | | | | 2.1 | TDI | 22* | 1:1.1 | 18 | 40 | 80 | 300 | 14 | 5 H |
| 6 | 10 | 20 | | 17.2 | | | | 0.75 | | | TDI | 24* | 1:1.1 | 22 | 40 | 80 | 300 | 25 | 2 H |
| 7 | 10 | 20 | | 11.5 | | | | 1.5 | | | TDI | 27* | 1:1.2 | 20 | 40 | 80 | 300 | 23 | 3 H |
| 8 | 10 | 20 | | 17.2 | | | | | | 1.05 | TDI | 25* | 1:1.2 | 15 | 40 | 80 | 300 | 16 | 5 H |
| 9 | 10 | 20 | | 17.2 | | | | | 1.46 | | TDI | 28* | 1:1.4 | 20 | 10 | 50 | 300 | 15 | 6 H |
| 10 | 10 | 20 | | | | | 10 | | | 1.05 | TDI | 23* | 1:1.2 | 10 | 20 | 50 | 300 | 28 | 6 H |
| 11 | 10 | 20 | | 17.2 | | | | | | | MDI | 25* | 1:1.4 | 10 | 20 | 50 | 300 | 25 | 5 H |
| 12 | 10 | 20 | | 17.2 | | | | | 1.46 | | MDI | 23* | 1:1.4 | 30 | 10 | 50 | 300 | 18 | 6 H |
| 13 | 10 | 20 | | 17.2 | | | | | 1.46 | | MDI | 29* | 1:1.4 | 25 | 10 | 50 | 300 | 17 | 5 H |
| 14 | 10 | 20 | | | | | 10 | | 1.46 | | MDI | 26* | 1:1.4 | 10 | 20 | 50 | 300 | 22 | 6 H |

TABLE 2-continued

Cationic Resins from the Epoxidecompounds A and B, the Fatty Acid Amides of the Diethylenetriamine C, the Masked Diisocyanate E and possibly the Amines D.

| Nr. | Reaction component weight (g) | | | | | | | | | | Blocking | | | | | | | | |
|---|---|---|---|---|---|---|---|---|---|---|---|---|---|---|---|---|---|---|---|
| | A | $B_1$ | $B_2$ | $C_2$ | $C_3$ | $C_4$ | $C_5$ | $D_1$ | $D_2$ | $D_3$ | 21* | agent | 30* | 31* | 32* | 33* | 34* | 35* | 36* |
| 15 | 10 | | 25 | 17.2 | | | | | 1.46 | | MDI | 26* | 1:1.4 | 15 | 40 | 50 | 300 | 18 | 6 H |

Meaning of abbreviations in Table 2
The meanings for A, B, C and D correspond to those of Table 1.
TDI = 2,4- and 2,6-diisocyanatotoluene, respectively, (mixture),
MDI = 4,4'-diisocyanato-diphenylmethane,
21* = type of diisocyanate
22* = 1-butanol blocking agent
23* = 2-butanol blocking agent
24* = 2-ethylhexanol blocking agent
25* = methylcellosolve = ethylenglycolmonomethylether blocking agent
26* = ethylcellosolve = ethylenglycolmonoethyleyher blocking agent
27* = butylcellosolve = ethylenglycolmonobutylether blocking agent
28* = 2-hydroxypropylmethacrylate blocking agent
29* = 2-hydroxyethylmethacrylate blocking agent
30* = mole ratio of diisocyanate to blocking agent
31* = mole percent of blocked diisocyanate with respect to the resin
32* = weight percent of methylcellosolveacetate = methylglycolacetate relative to the solids
33* = mole percent of acetic acid relative to the tertiary amine
34* = deposition voltage
35* = layer thickness [μm]
36* = lead pencil hardness 2. Preparation of waterdispersible cationic resins by employing a masked polyisocyanate (Table 2)

The process of preparation of the following 15 resins listed by starting composition (Table 2) and giving the deposition conditions was as follows:

The epoxidized polydiene and the polyglycidylether of the polyphenol were placed in a flask. The liquid was rapidly heated to about 120° C. under stirring and nitrogen purging and within about 5 minutes the amide component $C_2$, $C_3$, $C_4$ or $C_5$ and possibly the mixture with the secondary amines $D_1$, $D_2$ or $D_3$ was added. Based on the exothermic reation the temperature rose requiring initial cooling. The reaction then slowed down at 130° C. for about 10 minutes.

Following the liquid was rapidly cooled to about 70° to 80° C. and the solvent employed was added within a few minutes and the partially blocked polyisocyanate was added rapidly drop by drop under good stirring and cooling. For afterreacting the product was heated to a temperature of from about 70° to 80° C. for a time of about 30 to 40 minutes. Then water and acetic acid were added and the mixture was suspended at 25° C. to 30° C. with good stirring for several hours.

The resulting product usually comprising a solids content of about 70 weight percent was then thinned with such an amount of water, that a 20 weight percent solids concentration was obtained. The mixture was stirred for about another 20 hours for obtaining a good dispersion.

III. PREPARATION OF CATIONIC LACQUERS

1. Preparation of the pigment paste 3000 parts of a cationic resin according to II with a solids content of 80 weight percent in methylglycolacetate (without water and without acetic acid) were thinned with 1000 parts of a solvent mixture of methylisobutylketone, methylglycolacetate and isopropanol in a weight ratio of 1:1:1 and were neutralized with 90 parts of 50 weight percent acetic acid. Then 4200 parts of deionized water were added and then 1000 parts of talc or $SiO_2$ as siloid, 250 parts leadsilicate or lead phosphorus silicate, 50 parts carbon black and 1200 parts titanium dioxide. The product was then milled in a ball mill to a grainsize of from 9–9.5. The solids content of the pigment paste amounted to 44 to 46 weight percent.

2. Preparation of the final electrodeposition paint

ET-lacquer in grey tint 1930 parts of the pigment paste were dispersed with 2700 parts of an 80 weight percent nonneutralized resin, 76 parts of acetic acid, two parts tindibutyldilaurate, two parts copperoctoate and 1200 parts of demineralized water by employing a rapid stirrer. Before starting of the operation the bath is brought to a solids content of 20 weight percent with 28 parts lead acetate or 30 parts lead naphthenate or lead octoate with deionized water.

IV. COVERING OF THE METAL BODIES

The covering of the metal bodies in a dipping bath with the electro dipping lacquers prepared according to III. from the examples of tables 1 and 2 was performed at room temperature under good mixing of the bath suspension in general at 300 volts during 60 seconds. After successive rinsing with deionized water and after baking at 180° C. for 30 minutes the films exhibited a smooth surface property, high hardness values and layer thicknesses of between 16 and 25 μm. They were even on untreated iron sheets completely free of pinholes. The corrosion resistance of the lacquers was tested on Bonder-120-sheets. After 240 hours of the salt spray test no or only minimal attack was observed.

What is claimed is:

1. Water dispersible cationic resins for obtaining films with low pin hole formation and improved breakdown voltage, comprising the product of reaction of at least
   (A) an epoxidized polydiene,
   (B) a bisglycidylether of a polyphenol,
   (C) an amide compound, which is formed by one or more higher, substantially multiply unsaturated fatty acids and a polyamine and which may comprise a ketimine group or a hydroxy group, and if necessary
   (D) an organic secondary amine, at temperature from about 100° to 150° C., and/or
   (E) a partially and/or fully masked polyisocyanate, at temperature below about 100° C., which product comprises excess epoxide groups and carbon-carbon double bonds.

2. The waterdispersible resin according to claim 1 wherein the resins are rendered waterdispersible by formation of cationic groups in the presence of an acid.

3. The waterdispersible resins according to claim 1 wherein the organic secondary amine is diethylamine and/or methylethanolamine and/or diethanolamine.

4. The waterdispersible resins according to claim 1 wherein the partially or fully masked polyisocyanate is 4,4'-diisocyanato-diphenylmethane or toluenediisocyanate reacted with a member of the group consisting of ethyleneglycolmonomethylether, ethyleneglycolmonoethylether, butanol, 2-ethylhexanol-1, 2-hydroxyethylmethacrylate, 2-hydroxypropylmethacrylate and mixtures thereof.

5. The water dispersible resins according to claim 1, wherein said epoxidized polydiene is a member of the group consisting of polybutadiene-1,2, polybutadiene-1,4, polybutadiene-(1,2;1,4), derivatives and mixtures thereof.

6. The waterdispersible resins according to claim 1 wherein the components (B) is derived from bisphenol A.

7. The waterdispersible resins according to claim 1 wherein component (C) is based upon ricinenic fatty acids and wherein the acid amide groups are essentially derived from compounds having the structural formula

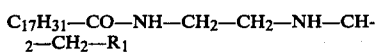

wherein $C_{17}H_{31}$ represents the hydrocarbon group of ricinenic acid substantially containing 9,11- and 9,12-octadecadienic acid and $R_1$ represents $-NH-CO-C_{17}H_{31}$, wherein $C_{17}H_{31}$ represents the hydrocarbon group of ricinenic acid or

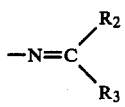

wherein $R_2$ is an alkyl group with from 1 to 2 carbon atoms and wherein $R_2$ is an alkyl group with from 1 to 4 carbon atoms or —OH.

8. The waterdispersible resins according to claim 7 wherein the acid amide groups are derived substantially from mixtures of compounds of the formula

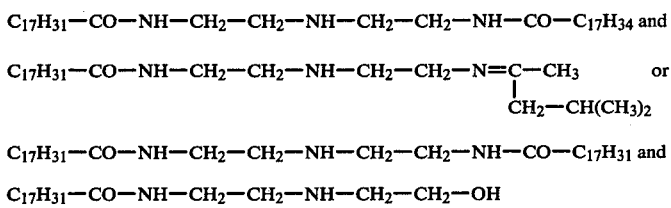

wherein $C_{17}H_{31}$ represents the hydrocarbon group of ricinenic acid.

9. The waterdispersible resins according to claim 1 wherein the higher fatty acids are based on linseed fatty acids and wherein the acid amide groups are derived from compounds having the structural formula

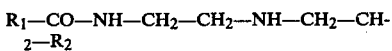

wherein $R_1$ represents the hydrocarbon group of the acids substantially contained in linseed fatty acids including linolenic acid, linolic acid and oleic acid and wherein $R_2$ represents $-NH-CO-R_1$ wherein $R_1$ represents the hydrocarbon group of the acids substantially contained in linseed fatty acids or

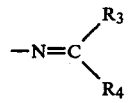

wherein $R_3$ is an alkyl group with 1 to 2 carbon atoms and $R_4$ is an alkyl group with from 1 to 4 carbon atoms or —OH.

10. The waterdispersible cationic resins according to claim 1 wherein the weight ratios of the components (A) to (B) to (C) to (D) is about 1000 to (1000-3000) to (250-3000) to (25-500) and wherein the epoxide content of (A) is from about 2 to 7 of epoxy equivalents per 1000 g of component (A) and wherein the epoxide content of (B) is from about 1 to 6 of epoxy equivalents per 1000 g of component (B).

11. The waterdispersible cationic resins according to claim 1 wherein the weight ratio of the components (A) to (B) to (C) to (D) to (E) is about 1000 to (1000-3000) to (250-3000) to (25-500) to (20-300) and wherein the epoxide content of (A) is from about 2 to 7 of epoxy equivalents per 1000 g of component (A) and wherein the epoxide content of (B) is from about 1 to 6 of epoxy equivalents per 1000 g of component (B).

12. The waterdispersible cationic resins according to claim 1 wherein the weight ratio of the components (A) to (B) to (C) to (E) is about 1000 to (1000-3000) to (500-3000) to (20-3000) and wherein the epoxide content of (A) is from about 2 to 7 of epoxy equivalents per 1000 g of component (A) and wherein the epoxide content of (B) is from about 1 to 6 of epoxy equivalents per 1000 g of component (B).

13. The waterdispersible cationic resins according to claim 1 wherein the component (B) is a bisglycidylether of bisphenol A.

14. The waterdispersible cationic resins according to claim 1 wherein the weight ratio of the components (A) to (B) to (C) is about 1000 to (1000-3000) to (500-3000) and the epoxide content of (A) is from about 2 to 7 of epoxy equivalents per 1000 g of component (A) and the epoxide content of (B) is from about 1 to 6 of epoxide equivalents per 1000 g of component (B).

15. The waterdispersible cationic resins according to claim 1 further comprising water in a weight ratio of water to the cationic resin of from about 3 to 20.

16. The waterdispersible cationic resins according to claim 1 as resulting after baking at a temperature of from about 150° to 200° C.

* * * * *